(No Model.) 5 Sheets—Sheet 1.
E. G. DAVIS.
CORN HARVESTER AND BINDER.
No. 596,855. Patented Jan. 4, 1898.
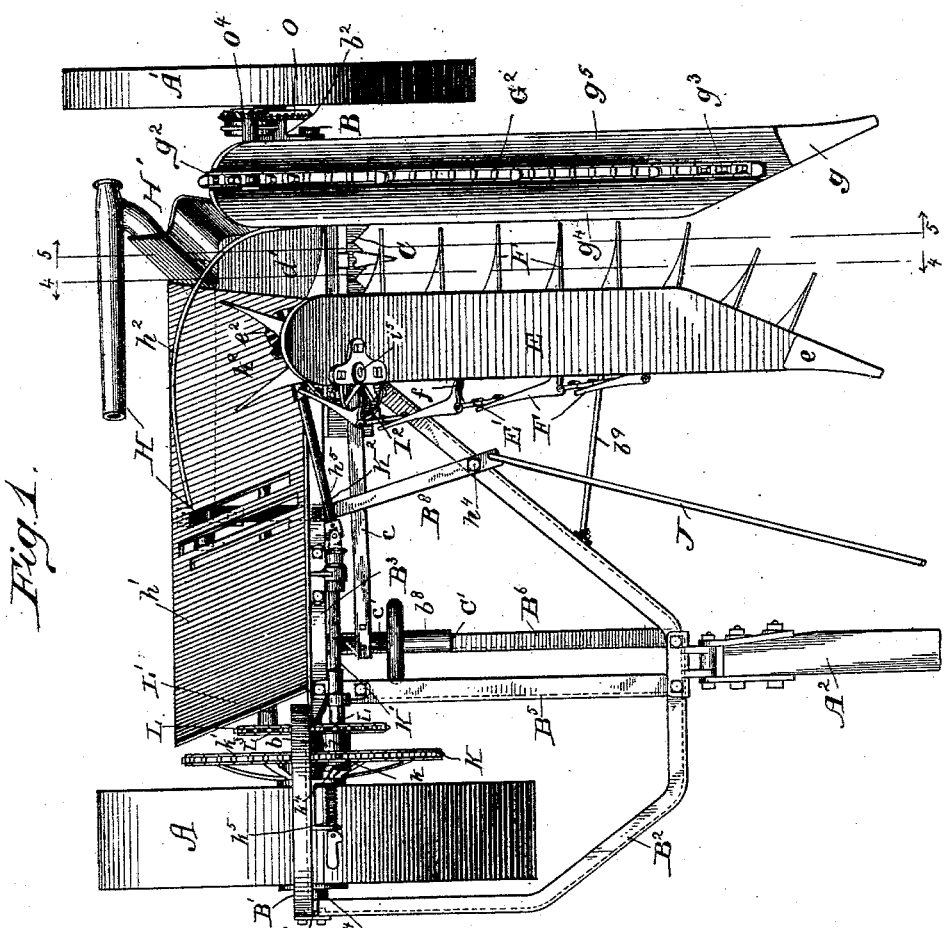
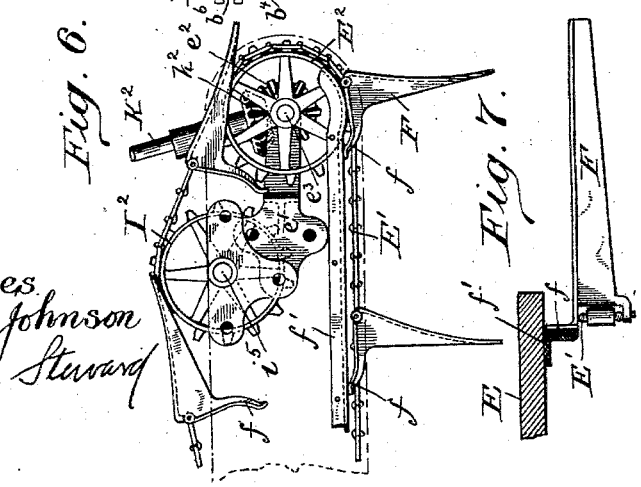
Witnesses
Arthur Johnson
Chas. A. Steward
Inventor
E. G. Davis

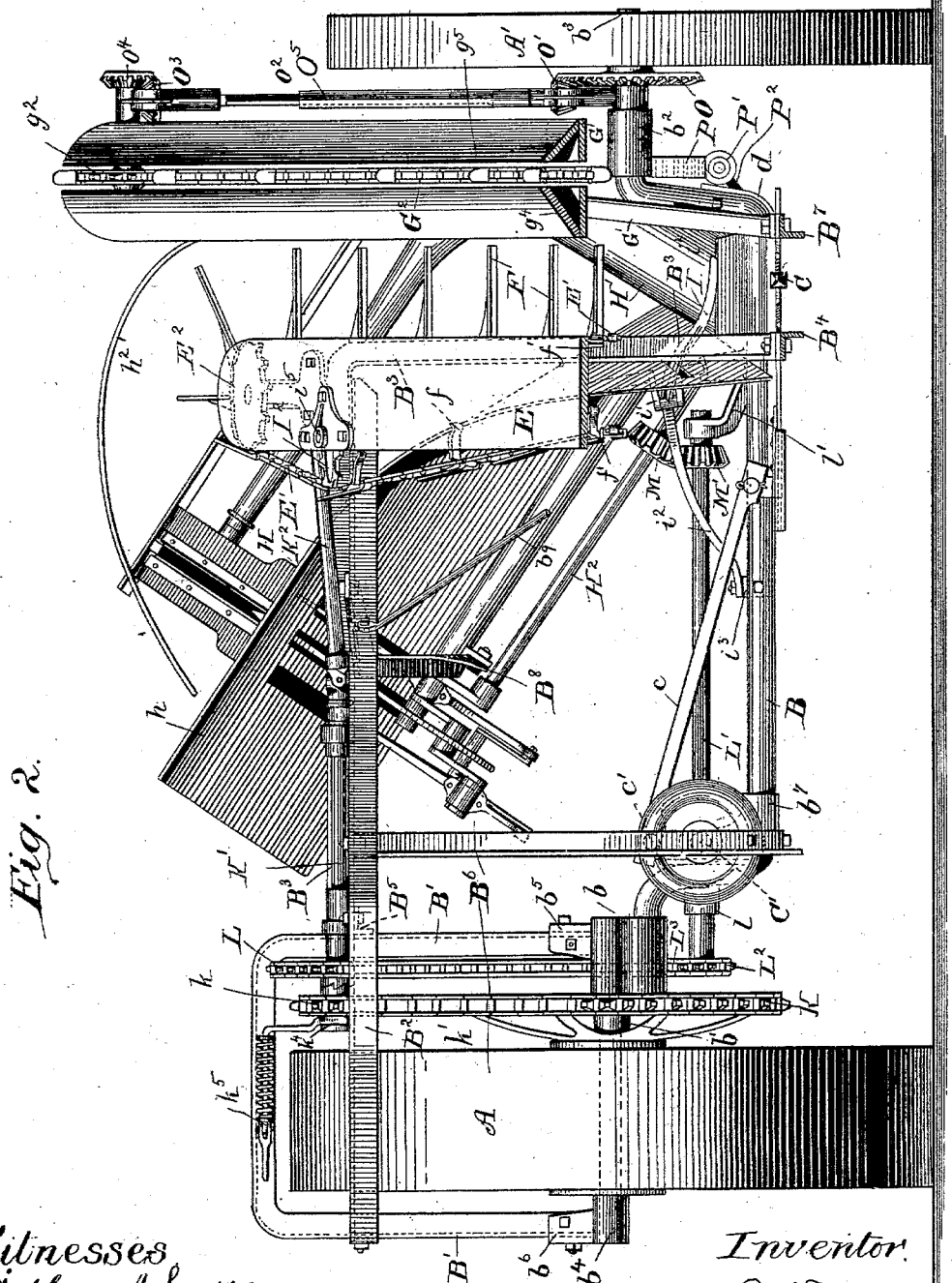

(No Model.) 5 Sheets—Sheet 3.
E. G. DAVIS.
CORN HARVESTER AND BINDER.
No. 596,855. Patented Jan. 4, 1898.

Witnesses.
Arthur Johnson
Chas. A. Steward.

Inventor
E. G. Davis

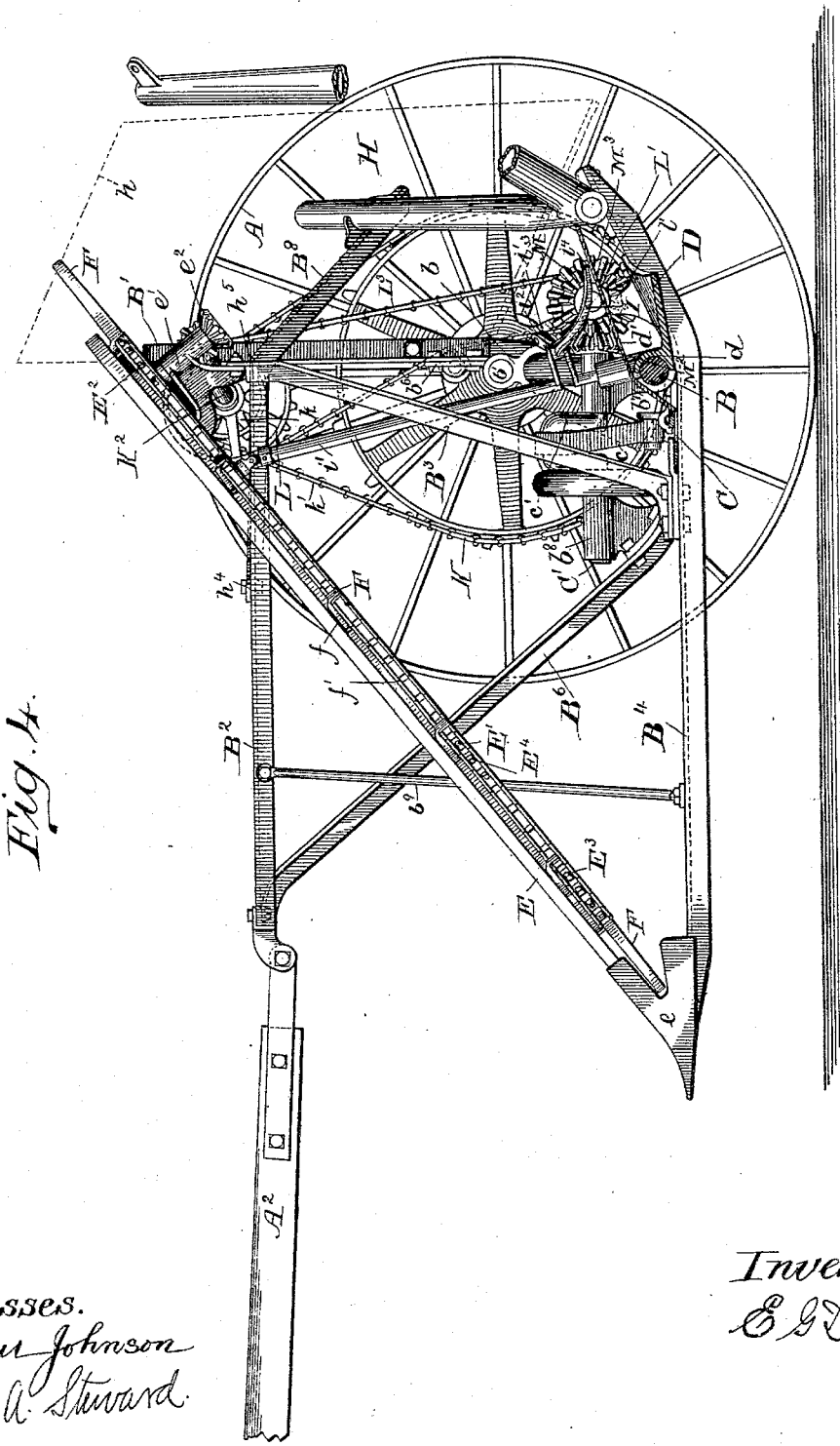

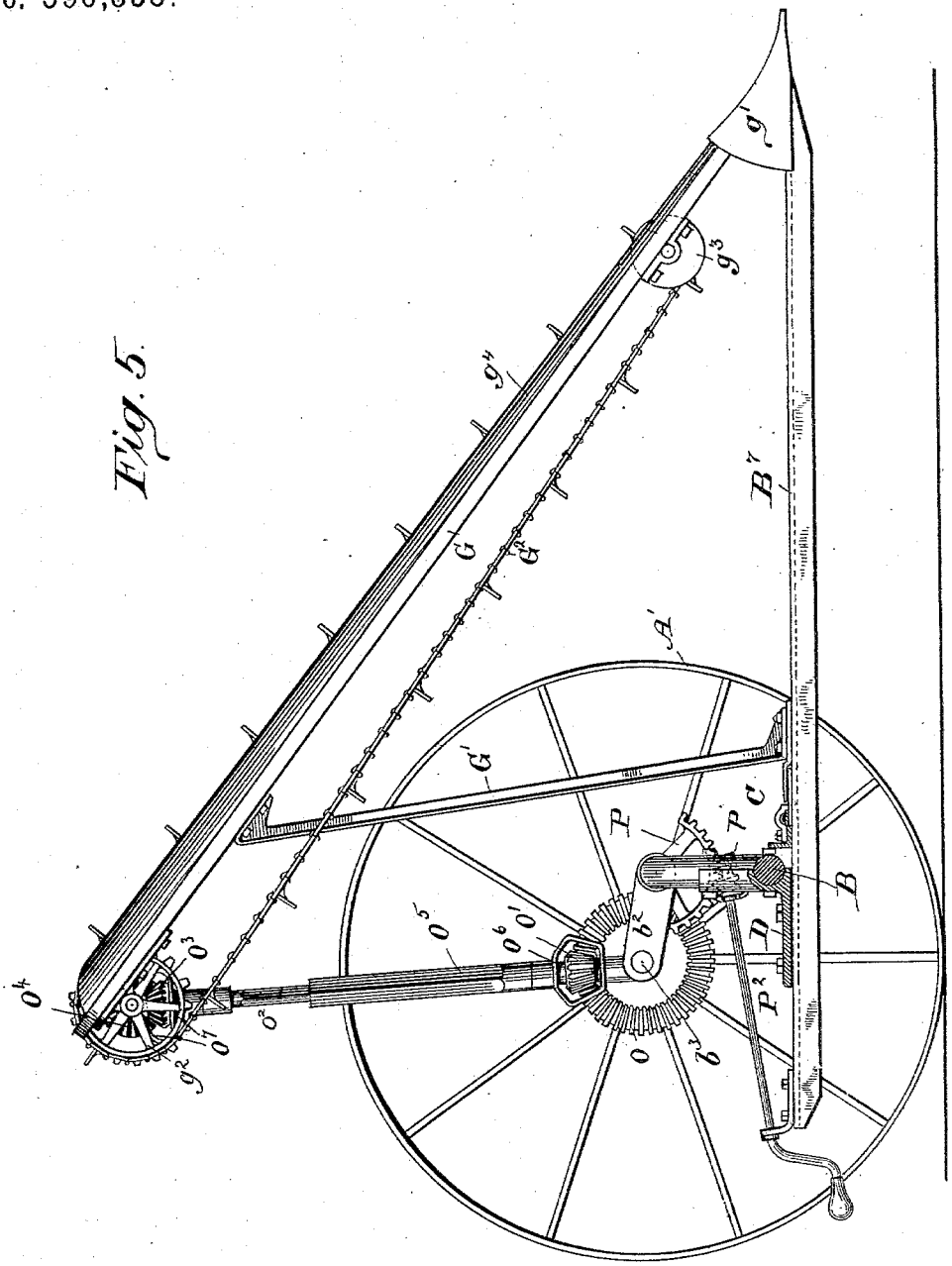

UNITED STATES PATENT OFFICE.

EDWARD G. DAVIS, OF CHICAGO, ILLINOIS, ASSIGNOR TO THE DEERING HARVESTER COMPANY, OF SAME PLACE.

CORN HARVESTER AND BINDER.

SPECIFICATION forming part of Letters Patent No. 596,855, dated January 4, 1898.

Application filed April 13, 1896. Serial No. 587,355. (No model.)

*To all whom it may concern:*

Be it known that I, EDWARD G. DAVIS, of Chicago, in the county of Cook and State of Illinois, have invented certain new and useful Improvements in Corn Harvesters and Binders, of which the following is a full description, reference being had to the accompanying drawings, in which—

Figure 3:
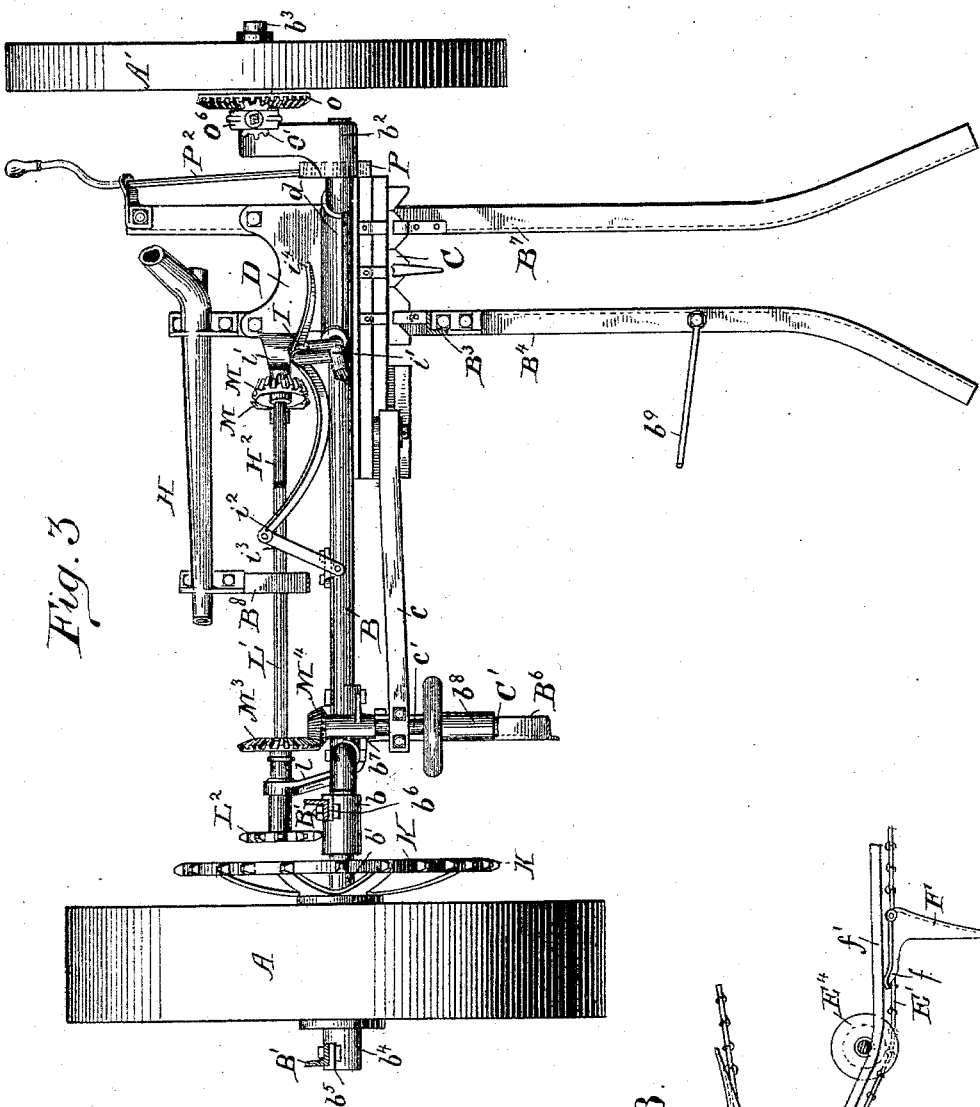
Figure 8:
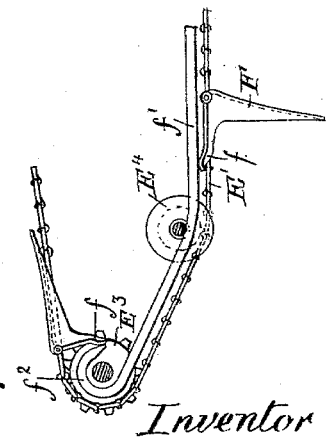

Figure 1 is a plan view. Fig. 2 is a front elevation, portions of the gathering devices being cut away. Fig. 3 is a plan view of the lower part of the machine. Fig. 4 is a stubbleward sectional elevation on the line 4 4 of Fig. 1. Fig. 5 is a cornward sectional elevation on the line 5 5 of Fig. 1. Figs. 6, 7, and 8 are details of the gathering devices.

My invention has for its object the simplification and more effective operation of corn harvesters and binders.

The drawings show a preferred exemplification of my invention, in which A and A' are the supporting-wheels.

B is a bent axle having at its stubbleward end a sleeve $b$, to which the stub-axle $b'$ is secured. A sleeve $b^2$ is secured to the cornward end of the said axle, which bracket extends rearwardly and supports a stub-axle $b^3$ for the supporting-wheel A', which travels on the outer side of the row of corn being cut and which may be called the "corn-wheel" in the same manner as the wheel that supports the side of the grain-harvester next to the standing grain is called the "grain-wheel." Upon the stubbleward end of the stub-axle $b'$ is a sleeve $b^4$. Upon the said sleeve and upon the sleeve $b$ are substantially vertical lugs $b^5$ and $b^6$, to which is secured the vertical member B' of the frame, which overreaches the main wheel A. A second member of the frame B² extends forwardly from the stubbleward side of the main wheel, then cornward to a point to which the draft-tongue A² is attached, and from thence diagonally rearward and cornward to a point over the cutting apparatus, where it is secured to a sill B³, that extends from the member B' directly grainward.

Near the junction of the sills B² and B³ the last-named sill is bent directly downward and extends to the stubbleward divider or gatherer sill B⁴. A sill B⁵ extends rearward from the forward extremity of the sill B² to the sill B³, and the sill B⁶ is in a vertical plane substantially parallel with the sill B⁵ when looked at from above, but extending diagonally downward to be secured to a foot-piece $b^7$ upon the stubbleward end of the bent portion of the axle B.

The main frame, as described, affords means to which the parts of the machine that operate upon the corn can be supported and moved and is competent to perform the usual functions of a main frame without being unnecessarily heavy.

B⁴ and B⁷ are the gatherer-sills, extending directly forward from the bent axle B, their forward ends diverging outwardly, as shown in Fig. 3. Between them and immediately in front of the said axle is the cutting apparatus C, which is given a suitable reciprocation by means of the pitman $c$ and the crank $c'$ upon the shaft C', which shaft is conveniently journaled in the foot-piece $b^7$ and in a bearing $b^8$, secured to the sill B⁶. A bridge D connects the sills B⁴ and B⁷, preferably at the rear of the axle B, and has a seating $d$, to which the said axle is secured.

E is the stubbleward gatherer-board, inclined rearwardly and is attached at its forward end to the shoe $e$ at the forward end of the sill B⁴ and at its upper and rearward end to the bracket $e'$, which forms the means whereby it is secured to the outer end of the main frame. A gatherer-chain E', having picker-fingers F, is supported upon the board E, which chain is given the desired movement in a rearward direction by the sprocket-wheel E² and runs around the idler-wheels E³ and E⁴, in order that its forwardly-operating portion may be deflected stubbleward, as shown in Figs. 1 and 8, for the purpose of picking up the down cornstalks properly.

The corn-side gatherer is supported upon a board G, which is secured to the upright strut G' and to the gatherer-shoe $g'$ at the forward end of the sill B⁷. The chain G² has picker-fingers and is drawn around the sprocket-wheel $g^2$ and the idler $g^3$, which wheels rotate upon substantially horizontal axes, as shown in Fig. 5. Boards $g^4$ and $g^5$ are attached to the board G and inclined toward the chain, which moves in a rearward direction between them.

The picker-fingers on the gatherer E are preferably made longer than usual and are so designed in order that they may perform the office of gathering the cornstalks, and the function of the chain on the corn-side gatherer may be said to be merely that of assisting the main gatherer by preventing the down and tangled stalks when bent thereover from becoming caught and held. It will be better understood when it is explained that heretofore corn has been successfully gathered with one chain having picker-teeth that pass rearwardly up what may be called the "gathering-slot," or the space between the two gatherers, and that when thus used it has been found that wind bent and twisted stalks have a tendency to become entangled with the outer divider and not pass up its guiding-surface as freely as to permit of clean and satisfactory work. I have therefore provided the chain G², which will move such stalks or stalks bent from any cause up the corn-side gatherer. These gatherer-chains should not be confused with other machines in which both chains operate in the gathering-slot and in which both chains have equal labor to do in handling the corn. The chain G², because of its position on the outer gatherer, will not operate to gather the corn, but simply keeps the corn, when gathered by the chain E' and the gatherer-boards E and G, from hanging and catching upon the said outer gatherer. It is clear from the foregoing that the machine is drawn along a row of corn to be cut, the gatherers presenting the cornstalks to the cutting apparatus to be severed.

Referring to Figs. 6 and 7, the gatherer-chain E', with its picker-fingers F, is shown. The said fingers have an extension $f$ at substantially right angles with their operating-surface, which tracks upon a bar $f'$, which is suitably secured to the board E in order to cause the said fingers to be held in their projected or aggressive position. The track $f'$ commences at the forward end of the board E in the curved portion $f^2$ and runs rearward to the rearward end of the said board and along its gathering edge. As the chain moves rearwardly along the gathering-slot the fingers F are brought to their operating position by their extensions $f$ striking the portion $f^2$ and are held in that position until they reach the highest point on the board E, about halfway around the sprocket-wheel E², where they are allowed to fold back against the chain. It will thus be seen that by making the fingers F of such length as to be competent in themselves to perform the function of gathering the cornstalks and presenting them to the cutting apparatus, they can be further utilized in tipping the cut stalks stubbleward onto the binder-table, as will be hereinafter described. To the rear of the cutting apparatus and extending stubbleward in an inclined position is the binder attachment H, having the binder-table $h$ inclined rearwardly and toward the standing corn. After the cornstalks are severed by the cutting apparatus their butts are forced along the butt-deck $d'$ against the board H', and their upper portions are deflected stubbleward by the deflector-rod $h^2$ and the chain E' as it travels around the wheel E², so that they are caused to fall by the aid of gravity upon the inclined binder-deck, down which they slide and are laterally carried by the packers into the binder-receptacle and bound in the usual manner. The board H' preferably extends from the cutting apparatus rearwardly to the binder-frame and has a desirable bend in it in order to prevent the butts from sliding out of the machine.

The part I may be called a "butt-moving" device and may be considered as any convenient device that will perform the function of moving the butts. It is shown as being formed like an ordinary packer of the grain-binder, being hung upon the cranked shaft $i'$ and having its stubbleward termination $i^3$ attached to the radius-link $i^3$. Its point $i^4$ operates in an irregular elliptical path immediately behind the cutting apparatus.

The binder attachment, which may be of any of the well-known forms used in binding grain, needs no further description and is supported upon the rearward end of the sill B⁴ and upon the bar B³, which is bolted to the bars B² and B³ at $h^4$ and $h^5$.

J may be considered as a draft-rod extending from a convenient point on the main frame to the usual whiffletrees. (Not shown.)

$b^9$ is a brace extending from the gatherer-sill B⁴ diagonally upward to the sill B².

K is a sprocket-wheel attached in any suitable way to the main wheel A and giving rotation to the shaft K' by means of the sprocket-wheel $k$ and the chain $k'$, which sprocket-wheel is adapted to be engaged and disengaged from the shaft K' by means of the spring-held clutch $k^4$ and its operating mechanism $k^5$.

To the gatherer end of the shaft K' is attached, by means of a knuckle-joint, a diagonal shaft K², on the outer end of which is a bevel-gear $k^2$, which meshes into a bevel-gear $e^2$, secured to the lower end of the spindle $e^3$, to which the sprocket-wheel E² is secured.

The sprocket-wheel I² is rotatably mounted upon a stud $i^5$, secured to the board E, which sprocket-wheel is caused to be rotated by the gatherer-chain E'. To its lower side is attached, by means of a knuckle-joint, the shaft $i'$.

The shaft K' has mounted thereon a sprocket-wheel L, and preferably beneath the binder-deck to the rear of the axle B is the shaft L'. Mounted upon it is a sprocket-wheel L², around which and around the sprocket-wheel L is thrown the chain L³. The shaft L' is journaled in bearings l, rearwardly extending from the part b⁷, and l', extending from the casting D.

Bevel-gears M and M' transmit rotation from the shaft L to the packer-shaft H². (Best shown in Fig. 3.) The crank-shaft C' is rotated from the shaft L by means of the bevel-gears M² and M³.

The corn-side gatherer-chain is rotated from the wheel A' by means of the bevel-gears O and O', the shaft O², and the bevel-gears O³ and O⁴, the latter being secured to the spindle of the sprocket-wheel g².

The shaft O² is preferably made square, so as to slide in the socket O⁵ and be rotated by it, the said socket being journaled in the bracket O⁶, that is pivoted on the stub-axle b³. The upper end of the shaft O² is journaled in a bracket O⁷, that swings on the spindle of the sprocket-wheel g².

P is a quadrant having teeth that engage a worm P' on the crank-shaft P². The quadrant is made a part of the bracket b², and the operator can, by means of the crank-shaft P² and the worm, rock the said bracket, so as to raise or lower the cutting apparatus to and from the ground.

I have shown the binder attachment H inclining directly stubbleward—that is, at right angles to the line of advance of the machine—but I do not wish to limit the placement of the binder in that position, because it may be placed at any other angle to the line of draft of the machine and still allow me to accomplish what I seek in this invention—namely, to move the cut stalks from the cutting apparatus to the binding-table in the most direct manner and to such a position that when bound and discharged the bundles will be out of the way of the team on the succeeding round.

I do not claim, broadly, the construction, arrangement, and combination of the following elements, namely: a main gearing-frame, a binding attachment suspended therefrom, a guiding-slot through which the stalks are gathered, said guiding-slot adapted to cause the stalks to fall upon the upper primary receiving portion of the binding-table, and a support for the butts of the stalks down which they may slide as the stalks are carried to the secondary or binder proper at the lower end of the binder-deck.

What I claim as my invention, and desire to secure by Letters Patent, is—

1. In a corn-binding harvester having stalk-gathering and stalk-cutting devices, a butt-receptacle adjacent to the said cutting device in which the butts may accumulate and rest while the bodies of the stalks are moving to their ultimate inclined position in the binder-receptacle, a conveyer adapted to force the butts of the stalks into said butt-receptacle, the said binder-receptacle having one end terminating at said butt-receptacle and its inclination being such that its stubble end is higher than the butt-receiving end whereby each individual stalk, when its butt is deposited in the butt-receptacle, may turn upon its butt as an axis and fall to the inclined binder-receptacle and while falling to said binder-receptacle be free to slide endwise, and gravity thus be permitted to aid in forming a bundle with an even butt-end, and means for directing the falling stalks onto said inclined table substantially as described.

2. The combination of the gatherers and the cutting apparatus with a binder attachment at the rear of said cutting apparatus, and having a binding-table the stubbleward end of which is higher than the grainward end, the said attachment adapted to receive the cut stalks from said gatherer with their length substantially transverse to the line of advance of the machine, and to discharge the bound bundle rearwardly, the passage of the butts of said stalks being in a rearward direction throughout the entire operation, substantially as described.

3. In a corn-harvester, the combination with the gatherers and the cutting apparatus, of an inclined binding attachment adapted to bind the bundles while transverse to the line of advance of the machine, said attachment having the end of its binding-table at which the butts of the stalks accumulate adjacent to the cutting apparatus, and means for deflecting the falling stalks stubbleward so as to direct them onto the inclined table without removing the butts of the stalks from the position where placed on the table, substantially as described.

4. In a corn-harvester, the combination with the gatherers and the cutting apparatus, of an inclined binding attachment arranged transversely, a butt-receptacle adapted to receive the butts of the stalks and retain them at a point adjacent to the said cutting apparatus, and means for deflecting the heads of said stalks stubbleward as they leave said gatherers, onto the transversely-placed inclined table of the binding attachment, substantially as described.

5. In a corn-harvester, the combination with the gatherers and the cutting apparatus, of an inclined binding attachment, a butt-receptacle at the rear of said cutting apparatus in which the butts of the cut stalks may accumulate, a butt-moving device adapted to form the butt of the bundle in said butt-receptacle, and means for deflecting the heads of the said cut stalks as they leave the gatherers stubbleward onto the inclined table of said binding-receptacle without disturbing the position of the butts of the stalks already placed in the said butt-receptacle, substantially as described.

6. In a corn-harvester, the combination with the gatherers and the cutting apparatus, of an inclined binder attachment, so placed as to be adapted to bind the bundles while in a transverse position relative to the line of advance of the machine and discharge them rearwardly, a butt-receptacle at the rear of said cutting apparatus, a butt-moving device adapted to form the butt of the bundle in the said butt-receptacle, and means for deflecting the heads of said cut stalks as they leave said gatherers stubbleward onto the inclined table of said binding attachment, substantially as described.

7. In a corn-harvester and in combination with the cutting apparatus, a binding attachment having a table that extends from the rear of said cutting apparatus in a stubbleward direction, its needle-arm operating in a plane substantially parallel to the line of advance of the machine, with the gatherers and a gatherer-chain, picker-teeth pivoted upon said chain and having heels $f$, a guide-bar $f'$ upon which the heels of said picker-teeth move as they are carried up the gatherer-slot, the said bar $f'$ extending partly around the rear end of the gatherer upon which the chain is mounted whereby the said picker-teeth are held in their aggressive position as they travel partly around the said end of the gatherer, a deflector for the upper portions of the stalks and a stop against which the butts of said stalks lodge, substantially as described.

8. In a corn-harvester and in combination with the cutting apparatus, a binding attachment having a table that extends from the rear of said cutting apparatus in a stubbleward direction, its needle-arm operating through a plane substantially parallel to the line of advance of the machine, with the gatherers and a gatherer-chain, picker-teeth pivoted upon said chain and having heels $f$, a guide-bar $f'$ upon which the heels of said picker-teeth move as they are carried up the gatherer-slot, the said bar $f'$ extending partly around the rear end of the gatherer upon which the chain is mounted, whereby the said picker-teeth are held in their aggressive position as they travel partly around the said end of the gatherer, a deflector for the upper portions of the stalks, a stop against which the butts of said stalks lodge, and a butt-moving device between said stop and said cutting apparatus, substantially as described.

9. In a corn-harvester frame the combination with the bent axle and the supporting-wheels of a gatherer-frame consisting of forwardly-extending sills and a bridge at the rear of said bent axle adapted to connect said sills with said bent axle, a wheel and gear frame consisting of the bars $B'$, $B^2$ and $B^3$ and being supported from beneath by bars $B^6$ and downward extensions from the said bars $B^3$ and $B'$, and the main gatherer-board supported upon the grainward end of said wheel and gear frame and upon the front end of the inner forwardly-extending sill, substantially as described.

10. In a corn-harvester, a combination of the gatherers and the cutting apparatus with an inclined binding-table extending from the rear of said cutting apparatus in a direction transverse to the line of advance of the machine, its stubbleward end being higher than its grainward end; a butt-forming receptacle at the rear of said cutting apparatus in which the butts of the cut stalks accumulate, and means for deflecting said cut stalks onto said inclined binding-table as they leave the gatherers, substantially as described.

EDWARD G. DAVIS.

Witnesses:
ARTHUR JOHNSON,
CHAS. A. STEWARD.